United States Patent
Lee

(10) Patent No.: US 10,007,335 B2
(45) Date of Patent: Jun. 26, 2018

(54) USER INTERFACE SELECTION BASED ON USER CONTEXT

(71) Applicant: EMPIRE TECHNOLOGY DEVELOPMENT LLC, Wilmington, DE (US)

(72) Inventor: Hyoung-Gon Lee, Gapyeong-gun (KR)

(73) Assignee: Empire Technology Development LLC, Wilmington, DE (US)

( * ) Notice: Subject to any disclaimer, the term of this patent is extended or adjusted under 35 U.S.C. 154(b) by 158 days.

(21) Appl. No.: 14/967,399

(22) Filed: Dec. 14, 2015

(65) Prior Publication Data

US 2017/0168557 A1    Jun. 15, 2017

(51) Int. Cl.
   *G06F 3/01*    (2006.01)
   *G06F 3/16*    (2006.01)

(52) U.S. Cl.
   CPC .............. *G06F 3/011* (2013.01); *G06F 3/167* (2013.01); *G06F 2203/0381* (2013.01)

(58) Field of Classification Search
   CPC .................................. G06F 3/011; G06F 3/167
   See application file for complete search history.

(56) References Cited

U.S. PATENT DOCUMENTS

| | | | | |
|---|---|---|---|---|
| 5,815,147 A * | 9/1998 | Bogen | ................... | A63F 13/005 |
| | | | | 715/835 |
| 6,064,668 A * | 5/2000 | Brown | ............... | H04B 10/1141 |
| | | | | 340/12.22 |
| 2002/0083444 A1 * | 6/2002 | Blasko | ................... | G06Q 30/02 |
| | | | | 725/35 |
| 2002/0180695 A1 * | 12/2002 | Lawrence | ............. | G06F 3/0334 |
| | | | | 345/156 |
| 2006/0224986 A1 * | 10/2006 | Lindsay | ................ | G06F 3/0481 |
| | | | | 715/766 |
| 2006/0261982 A1 * | 11/2006 | Kong | ...................... | G06F 3/038 |
| | | | | 341/22 |
| 2008/0284731 A1 * | 11/2008 | Mak Pui See | .......... | A63F 13/06 |
| | | | | 345/161 |
| 2009/0201248 A1 * | 8/2009 | Negulescu | .............. | G06F 3/016 |
| | | | | 345/157 |

(Continued)

OTHER PUBLICATIONS

Fukahori, K., et al., "Exploring Subtle Foot Plantar-based Gestures with Sock-placed Pressure Sensors," Proceedings of the 33rd Annual ACM Conference on Human Factors in Computing Systems, pp. 3019-3028 (Apr. 18-23, 2015).

(Continued)

*Primary Examiner* — Ricardo L Osorio

(57) ABSTRACT

Technologies are generally described to provide alternate user interfaces based on user context. In some examples, a user interface system may measure a user characteristic associated with a particular user interface type. The user interface system may then determine whether the measured user characteristic is suitable for use as a user interface input, for example by comparison with a baseline user characteristic. Upon determination that the measured user characteristic is suitable, the user interface system may use the measured user characteristic for user interface purposes. On the other hand, upon determination that the measured user characteristic is not suitable, the user interface system may use a different user interface type to attempt to receive user inputs.

18 Claims, 6 Drawing Sheets

(56) References Cited

U.S. PATENT DOCUMENTS

| | | | |
|---|---|---|---|
| 2010/0185681 A1* | 7/2010 | Han | G06F 3/04817 |
| | | | 707/802 |
| 2011/0054359 A1 | 3/2011 | Sazonov et al. | |
| 2012/0004740 A1* | 1/2012 | Yang | G06F 3/0231 |
| | | | 700/12 |
| 2014/0055483 A1 | 2/2014 | Pance et al. | |
| 2016/0092036 A1* | 3/2016 | Rodgers | G06F 17/30076 |
| | | | 715/762 |
| 2017/0011308 A1* | 1/2017 | Sun | G06N 99/005 |
| 2017/0053542 A1* | 2/2017 | Wilson | G09B 5/02 |

OTHER PUBLICATIONS

Scott, J., et al., "Sensing Foot Gestures from the Pocket," Proceedings of the 23nd annual ACM symposium on User interface software and technology, pp. 199-208 (Oct. 3-6, 2010).

Weiss, C.C., "Ford's new kick-activated tailgate provides hands-free opening," accessed at http://web.archive.org/web/20150921215111/http://www.gizmag.com/ford-kick-activated-tailgate/21746/ , Mar. 7, 2012, pp. 19.

* cited by examiner

COMPUTER PROGRAM PRODUCT 600

SIGNAL-BEARING MEDIUM 602

604 AT LEAST ONE OF

ONE OR MORE INSTRUCTIONS TO MEASURE ONE OR MORE USER CHARACTERISTICS;
    ONE OR MORE INSTRUCTIONS TO COMPARE THE MEASURED USER CHARACTERISTICS WITH BASELINE CHARACTERISTICS;
    ONE OR MORE INSTRUCTIONS TO GENERATE A USER INTERFACE CONCLUSION BASED ON THE COMPARISON; AND
    ONE OR MORE INSTRUCTIONS TO SELECT USER INTERFACE(S) TO ACTIVATE OR USE AND/OR SELECT USER INTERFACE(S) TO DEACTIVATE OR IGNORE BASED ON THE USER INTERFACE CONCLUSION.

| COMPUTER-READABLE MEDIUM 606 | RECORDABLE MEDIUM 608 | COMMUNICATIONS MEDIUM 610 |
|---|---|---|

FIG. 6

USER INTERFACE SELECTION BASED ON USER CONTEXT

BACKGROUND

Unless otherwise indicated herein, the materials described in this section are not prior art to the claims in this application and are not admitted to be prior art by inclusion in this section.

A human-computer interface or user interface (UI) may allow a user to interact with an electronic computer. In general, user interface implementations may be based on converting some natural human action into computer input. For example, a keyboard, a mouse, a stylus, or a touchscreen may be used to convert user hand movements into computer input. A microphone may be used to convert user speech into computer input, and a camera may be used to convert user eye or body movements into computer input.

SUMMARY

The present disclosure generally describes techniques to select user interfaces based on user context.

According to some examples, a method is provided to activate alternative user interfaces based on user context. The method may include measuring a user characteristic using a sensor, determining a difference between the measured user characteristic and a baseline characteristic, generating a user interface conclusion based on the determined difference, and activating a first user interface or a second user interface based on the user interface conclusion.

According to other examples, a user interface system is provided. The user interface system may include a sensor configured to measure a user characteristic, a first user interface configured to receive user input of a first type, a second user interface configured to receive user input of a second type, and a controller coupled to the sensor, the first user interface, and the second user interface. The controller may be configured to receive a user characteristic measurement from the sensor, determine a difference between the user characteristic measurement and a baseline characteristic, and use the first user interface or the second user interface to receive user input based on the determined difference.

According to further examples, a user interface selection system is provided. The user interface selection system may include a memory configured to store user characteristic baseline data, a user context analysis module coupled to the memory, and a user interface selection module coupled to the user context analysis module. The user context analysis module may be configured to receive a user characteristic measurement measured by a sensor, determine a difference between the first user characteristic measurement and the baseline data, and generate a user interface conclusion based on the difference. The user interface selection module may be configured to receive the user interface conclusion, and in response to a determination that the user interface conclusion is abnormal, ignore a first user input received from a first user interface and respond to a second user input received from a second user interface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which;

FIG. 6 illustrates a block diagram of an example computer program product, all arranged in accordance with at least some embodiments described herein.

DETAILED DESCRIPTION

Figure 1:
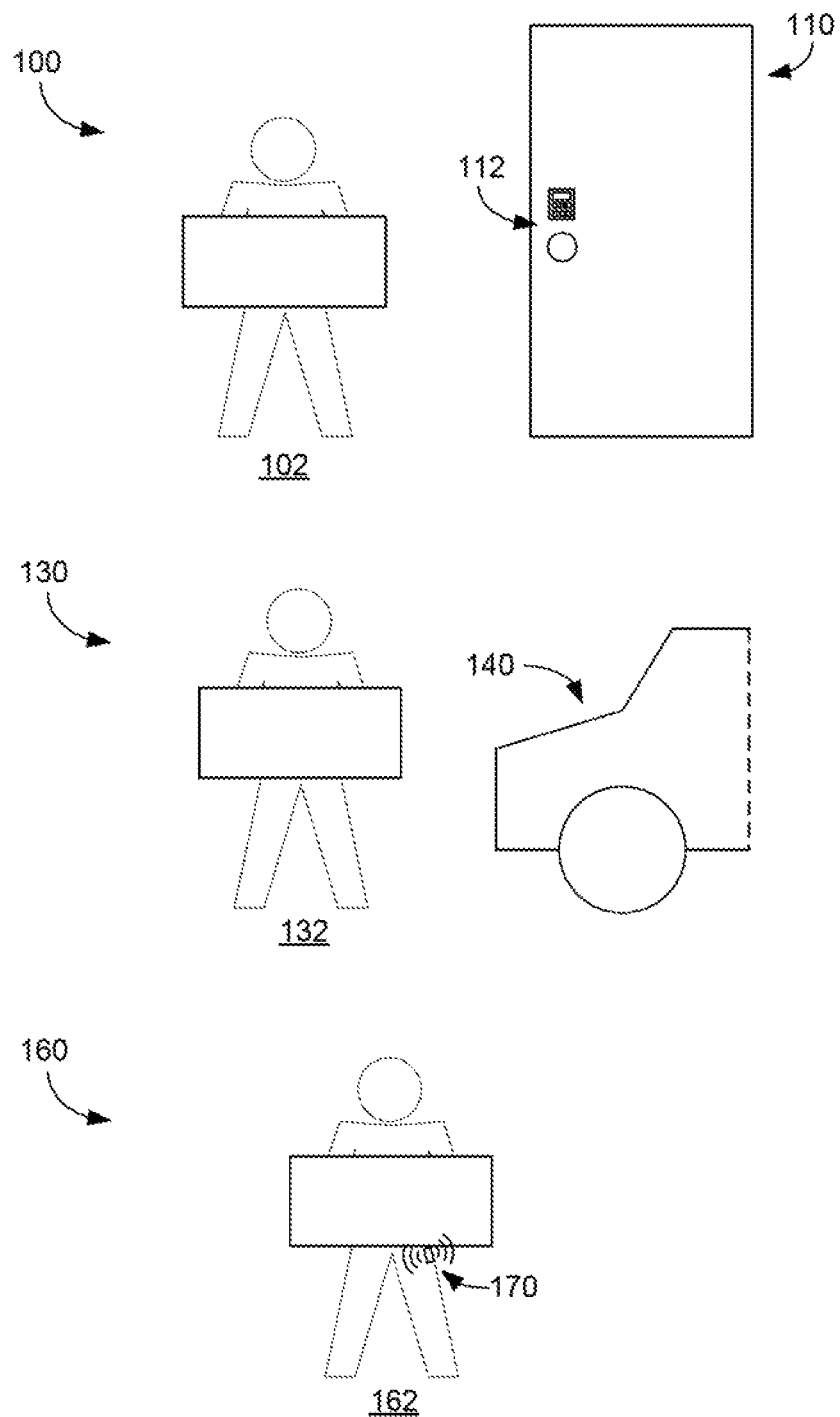
FIG. 1 illustrates how user context may affect the available user interfaces.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia to methods, apparatus, systems, devices, and/or computer program products related to selection of user interfaces based on user context.

Briefly stated, technologies are generally described to provide alternate user interfaces based on user context. In some examples, a user interface system may measure a user characteristic or context associated with a particular user interface type. For example, availability of user hands may be determined based on weight distribution or gait measure through a foot or plantar sensor. The user interface system may then determine whether the measured user characteristic is suitable for use as a user interface input, for example by comparison with a baseline user characteristic. Upon determination that the measured user characteristic is suitable, the user interface system may use the measured user characteristic for user interface purposes. On the other hand, upon determination that the measured user characteristic is not suitable, the user interface system may select a different user interface type to attempt to receive user inputs.

FIG. 1 illustrates how user context may affect the available user interfaces, arranged in accordance with at least some embodiments described herein.

As described above, UI implementations may be based on converting some natural human or animal action into computer input. For example, different types of UIs may convert human hand movements, human speech, human eye movements, and/or human body movements or gestures into inputs. Although many different types of human actions may be used as the basis for a UI, hand-based UIs may be preferred in most cases. Such interfaces may include keyboards or keypads, mice or other discrete pointing devices, touchscreens, and gesture-sensing interfaces.

In some situations, a user may be temporarily unable to use a specific or particular UI type. For example, a first diagram 100 depicts a user 102 carrying an object that wishes to open a door 110. The door 110 may be equipped with an electronic entry system 112 configured with a hand-based UI. However, the user 102 may be unable to conveniently use the hand-based UI because of the carried item. Accordingly, the user 102 may need to drop the item or place the item elsewhere in order to operate the entry system 112.

A second diagram 130 depicts another situation, in which a user 132 may be temporarily unable to use a particular UI type. The user 132, carrying an object, may wish to open a storage compartment 140 of a vehicle. The compartment 140, similar to the door 110, may be equipped with an electronic opening mechanism configured to respond to a hand-based UI. For example, the compartment 140 may open when a user presses a button on the compartment 140, or when a user manually actuates a remote controller. However, similar to the user 102, the user 132 may be unable to conveniently open the compartment 140 because of the carried object.

A third diagram 160 depicts yet another situation, in which a user 162 may be temporarily unable to use a particular UI type. The user 162 may carry a portable electronic device 170, such as a smartphone, in a pocket, purse, or other container. While the user 162 is carrying an object, the device 170 may notify the user 162 of an event, such as an incoming call or a calendar appointment, using an audible or tactile alert. In this situation, the user 162, similar to the users 102 and 132, may be unable to conveniently attend to the device 170 because of the carried object.

Figure 2:
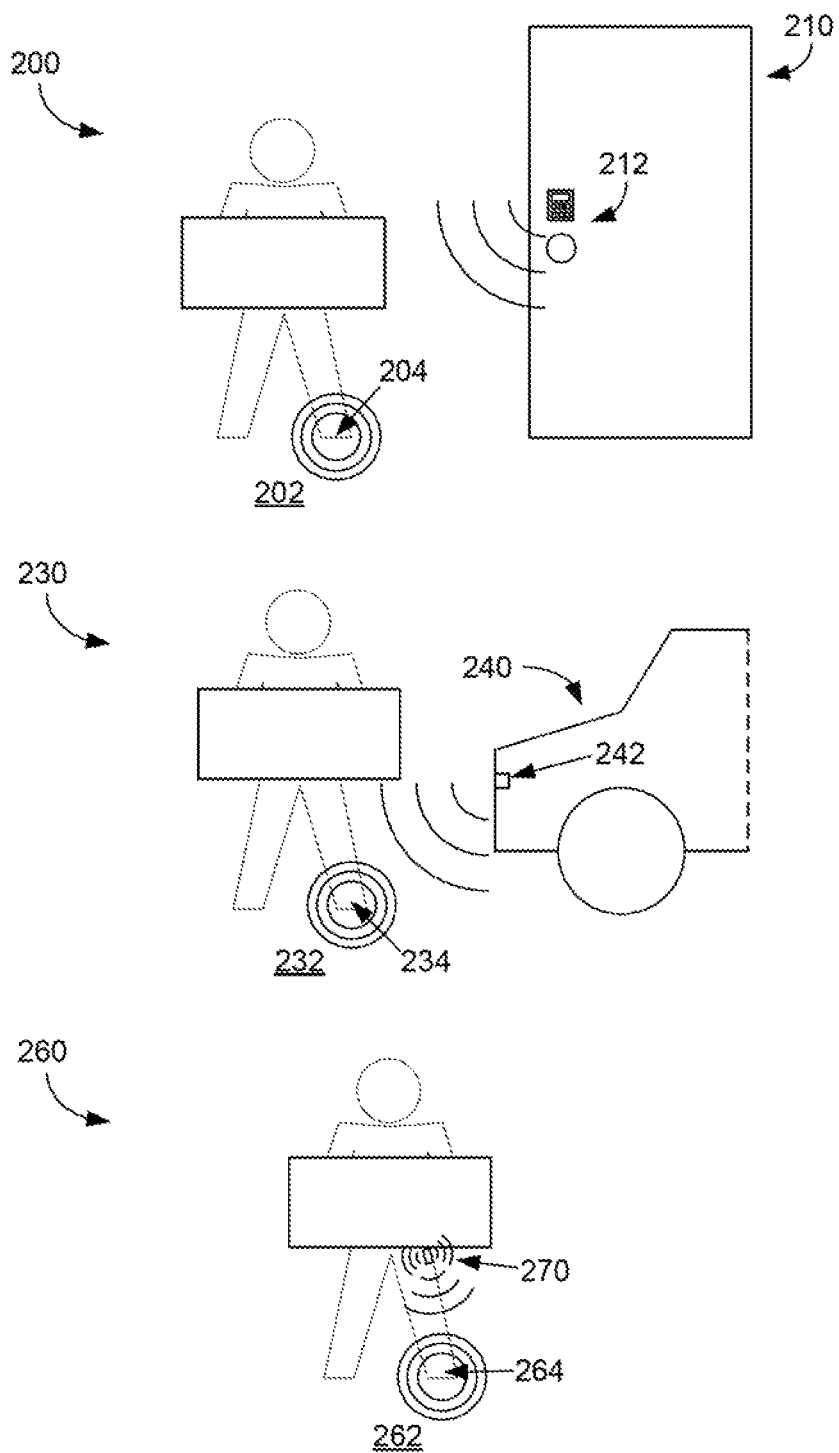
FIG. 2 illustrates how user context may be used to guide the selection of appropriate user interfaces.

FIG. 2 illustrates how user context may be used to guide the selection of appropriate user interfaces, arranged in accordance with at least some embodiments described herein.

In some embodiments, a UI system may be able to determine that a user is temporarily unable to use a preferred UI type, and may instead respond to user inputs through an alternate UI type. As depicted in a first diagram 200, which is similar to the first diagram 100, a user 202 carrying an object may wish to open a door 210. The door 210 may be equipped with an electronic entry system 212 configured with a hand-based UI. Differently from the first diagram 100, the user 202 may be able to use an alternate UI 204, and the electronic entry system 212 may also be configured to respond to the alternate UI 204. For example, the alternate UI 204 may include a smart shoe that implements foot or plantar sensors and may be configured to communicate with the electronic entry system 212. Because the user 202 may be unable to use the hand-based UI of the electronic entry system 212 while carrying the object, the user 202 may instead use the alternate UI 204 to operate the electronic entry system 212, thereby causing the door 210 to open.

A second diagram 230 depicts another situation, in which a user 232 carrying an object may be attempting to open a storage compartment 240 of a vehicle. The user 232, similar to the user 202, may also use an alternate UI 234, such as a smart shoe implementing foot or plantar sensors as described above. The storage compartment 240 may be equipped with an electronic opening mechanism configured to respond both to a hand-based UI and to the alternate UI 234 via a sensor 242. As in the first diagram 200, because the user 232 may be unable to use the hand-based UI of the electronic opening mechanism while carrying the object, the user may instead use the alternate UI 234 to open the storage compartment 240.

A third diagram 260 depicts a situation, in which a user 262 receives a notification from a carried electronic device 270 while carrying an object. Similar to the situations depicted in the first diagram 200 and the second diagram 230, the electronic device 270 may be configured to respond to both a hand-based UI and to an alternate UI 264. Accordingly, instead of using a hand-based UI to attend to the device 270 the user 262 may be able to use an alternate UI 264, which may be voice input or a smart shoe as discussed above, for example, to control the device 270.

Figure 3:
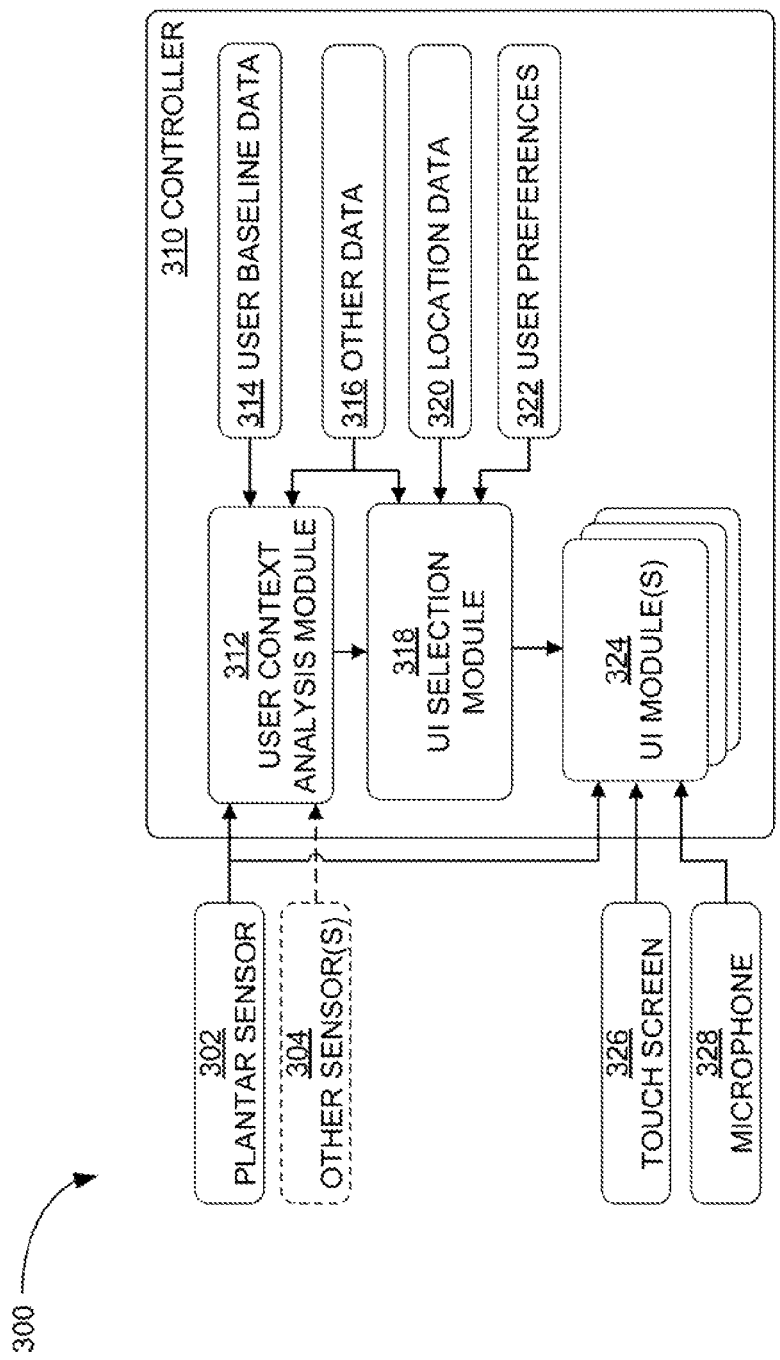
FIG. 3 illustrates an example system where sensed user characteristics may guide the selection of an appropriate interface to present to a user.

FIG. 3 illustrates an example system where sensed user characteristics may guide the selection of an appropriate interface to present to a user, arranged in accordance with at least some embodiments described herein.

As shown in FIG. 3, a UI system 300 may include a controller 310 coupled to a plantar sensor 302 and one or more other sensors 304. The controller 310 may also be coupled to other input output devices, such as a touch screen 326 and a microphone 328.

As described above, a UI system according to embodiments may be able to respond to inputs from multiple UI types. For example, the UI system 300 may be able to respond to an input from a hand-based UI such as the touch screen 326 and/or an input from a foot-based UI such as the plantar sensor 302. The UI system 300 may further be configured to (a) determine the appropriate type of UI input to respond to, and (b) to distinguish between user-intended inputs of a particular UI type from unintended inputs of the same UI type. For example, if the UI system 300 receives input from both the plantar sensor 302 and the microphone 328, the UI system 300 may determine whether it should respond to the input from the plantar sensor 302 or whether it should instead respond to the input from the microphone 328. As another example, if the UI system detects input from the plantar sensor 302, the UI system 300 may determine whether the input corresponds to an intentional command from the user or to an ordinary foot movement, such as walking.

Accordingly, the controller 310 may include a user context analysis module 312 configured to receive inputs from the plantar sensor 302 and/or the other sensor(s) 304. The user context analysis module 312 may be configured to determine a user context based on inputs from one or more sensors such as the plantar sensor 302, where the user context may indicate whether the user is able to access hand-based UI, for example. In some embodiments, the user context analysis module 312 may have access to user baseline data 314 to determine the user context. The user baseline data 314 may store prior data collected front the plantar sensor 302 and/or the other sensor(s) 304 associated with the user. For example, a user's wearing pattern of the plantar sensor 302 may be determined from prior usage, and the user baseline data 314 may include information about the user's average weight (for example, in terms of foot pressure data sensed, by the plantar sensor 302), information about the average weight distribution of the user on both feet (assuming that the plantar sensor 302 includes sensors associated with each foot), information about the user's typical gait, and other relevant historical information associated with the user's feet movement. In particular, the user baseline data 314 may represent sensor data collected when the user is not attempting to provide UI inputs. In other examples, the user baseline data 314 may be seasonal, for example, heavier clothing worn by the user in colder season may affect weight. The user baseline data 314 may also be based on particular activity undertaken by the user. The user may indicate what activity the user is currently performing, or the activity may be interred from user calendar or any of the sensors discussed herein. For example, swimming may affect weight, running may affect gait, etc. In yet other examples, other factors that may affect the user baseline data 314 such as weight gain or loss by the user, health problems (e.g., injured limbs, etc.) may be factored into the determination.

The user context analysis module 312 may then be able to use the already-collected user baseline data 314 to determine whether data received from the plantar sensor 302 and/or the other sensors 304 indicate that a user's hands are likely available to interact with a conventional user interface (in other words, the user is probably not carrying a fairly large or heavy object) or unavailable to interact with a conventional user interface (in other, words, the user is probably carrying a fairly large or heavy object). In some embodiments, the user context analysis module 312 may compare the received data to the user baseline data 314. If the difference between the received data and the user baseline data 314 is relatively low (for example, below a particular threshold), then the user context analysis module 312 may conclude that the user's hands are likely available. On the other hand, if the difference between the received data and the user baseline data 314 is relatively large (for example, above a particular threshold), then the user context analysis module 312 may conclude that the user's hands are likely unavailable.

In one example, the user context analysis module 312 may determine that data received from the plantar sensor 302 indicates that the user's weight has increased with respect to the user baseline data 314. The user context analysis module 312 may then conclude that the user may be carrying a relatively heavy object, and that the user's hands are likely unavailable.

In another example, data received from the plantar sensor 302 may indicate that the user's weight distribution has changed with respect to the user baseline data 314. The user context analysis module 312 may then conclude that the user may be carrying an object using one or two hands, and may be able to determine the specific hand used to carry the object. Based on this information, the user context analysis module 312 may be able to determine whether the user's hands (none, one, or both) are available.

In yet another example, data received from the plantar sensor 302 may indicate that the user's gait has changed with respect to the user baseline data 314. The user context analysis module 312 may then conclude that the user may be carrying an object with a large volume, and that the user's hands are likely unavailable. In some embodiments, gait information may be used to determine whether a user is wearing a bag or carrying an object with hands, which the user context analysis module 312 may use to determine whether the user's hands are available.

In some embodiments, the user context analysis module 312 may also use data received from the other sensors 304 to determine user context. For example, the other sensors 304 may include a sensor capable of identifying user arm or wrist movements, such as a smartwatch or a sports tracker. User arm movements, similar to gait information as described above, may vary based on whether objects are held in the hand. Accordingly, the user context analysis module 312 may be able to use arm movement data received from the other sensors 304 to supplement the determination of whether the user's hands are available.

The user context analysis module 312 may also use other data 316 to determine user context. In some embodiments, the other data 316 may include prior user context determinations and associated user reactions. For example, the user context analysis module 312 may have previously determined that a user's hands were available when in fact the user's hands were unavailable, or vice-versa. These misdetection cases may be used by the user context analysis module 312, the controller 310, or another processor as supervised data for machine learning, thereby improving the accuracy of user context detection.

The user context conclusion determined by the user context analysis module 312 (for example, whether the user's hands are likely available or not) may then be sent to a UI selection module 318. The UI selection module 318 may then select or activate one or more UI modules 324, each of which may be coupled to a UI such as the plantar sensor 302, the touch screen 326, and the microphone 328, for receiving UI inputs. For example, if the user context conclusion from the user context analysis module 312 is that the user's hands are available, the UI selection module 318 may select the UI module coupled to the touch screen 326 to receive UI inputs. In some embodiments, the UI selection module 318 may ignore inputs from other UIs, such as the plantar sensor 302 and the microphone 328, or deactivate the UI modules corresponding to those UIs. In other embodiments, a particular UI module (for example, the one coupled to the touch screen 326) may be considered a primary UI, and the other UI modules may be considered secondary UIs. The UI selection module 318 may then determine whether the user context conclusion is normal (that is, the user can access the primary UI) or abnormal (that is, the user cannot access the primary UI), and select and/or deactivate UIs accordingly. For example, the UI selection module 318 may activate the primary UI if the user context conclusion is normal, and may activate a secondary UI if the user context conclusion is abnormal.

In further embodiments, the UI selection module 318 may use environmental parameters to determine the UI module to be selected. For example, the UI selection module 318 may use the other data 316, location data 320, and/or user preferences data 322. The other data 316 may include identifiers for nearby devices that may be able to serve as alternative UIs. The location data 320 may indicate whether the current location of the user is amenable to particular types of UI inputs. The user preferences data 322 may indicate whether the user prefers to use one type of UI (for example, speech recognition) to another type of UI (for example, hand-based UI).

Figure 4:
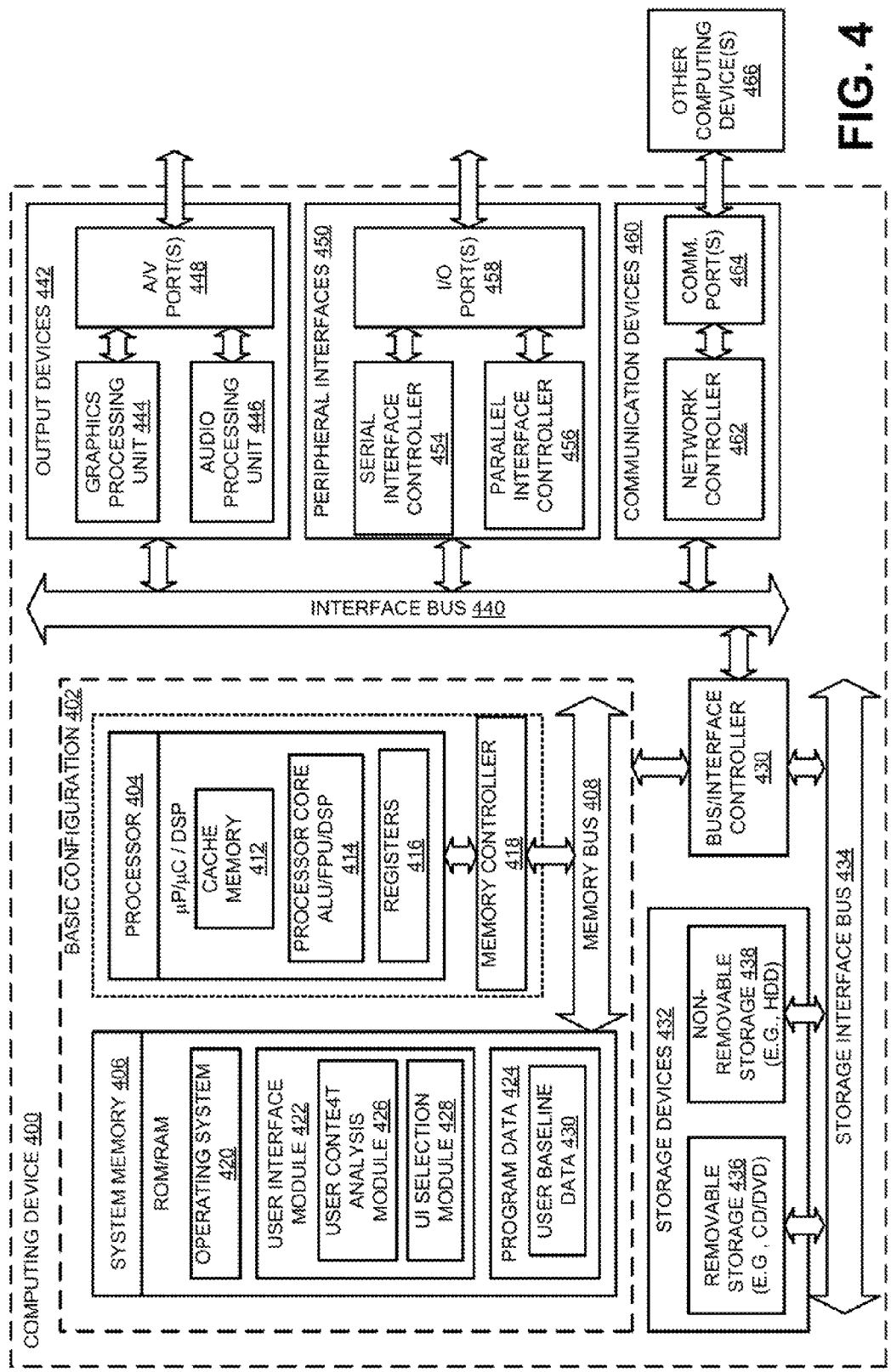
FIG. 4 illustrates a general purpose computing device, which may be used to provide user interface selection based on user context.

FIG. 4 illustrates a general purpose computing device, which may be used to provide user interface selection based on user context, arranged in accordance with at least some embodiments described herein.

For example, the computing device 400 may be used to select an appropriate user interface based on user context as described herein. In an example basic configuration 402, the computing device 400 may include one or more processors 404 and a system memory 406. A memory bus 408 may be used to communicate between the processor 404 and the system memory 406. The basic configuration 402 is illustrated in FIG. 4 by those components within the inner dashed line.

Depending on the desired configuration, the processor 404 may be of any type, including but not limited to a microprocessor (μP), a microcontroller (μC), a digital signal processor (DSP), or any combination thereof. The processor 404 may include one more levels of caching, such as a level cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, a user interface module 422, and program data 424. The user interface module 422 may include a user context analysis module 426 configured to provide a user interface conclusion based on user context and a UI selection module 428 configured to select an appropriate UI based on the user interface conclusion as described herein. The program data 424 may include, among other data, user baseline data 430 or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., one or more output devices 442, one or more peripheral interfaces 450, and one or more communication devices 460) to the basic configuration 402 via the bus; interface controller 430. Some of the example output devices 442 include a graphics processing unit 444 and an audio processing unit 446, which may be configured to communicate to various external devices such as a display or speakers via one or more A/V ports 448. One or more example peripheral interfaces 450 may include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 418. An example communication device 460 includes a network controller 462, which may be arranged to facilitate communications with one or more other computing devices 466 over a network communication link via one or more communication ports 464. The one or more other computing devices 466 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Figure 5:
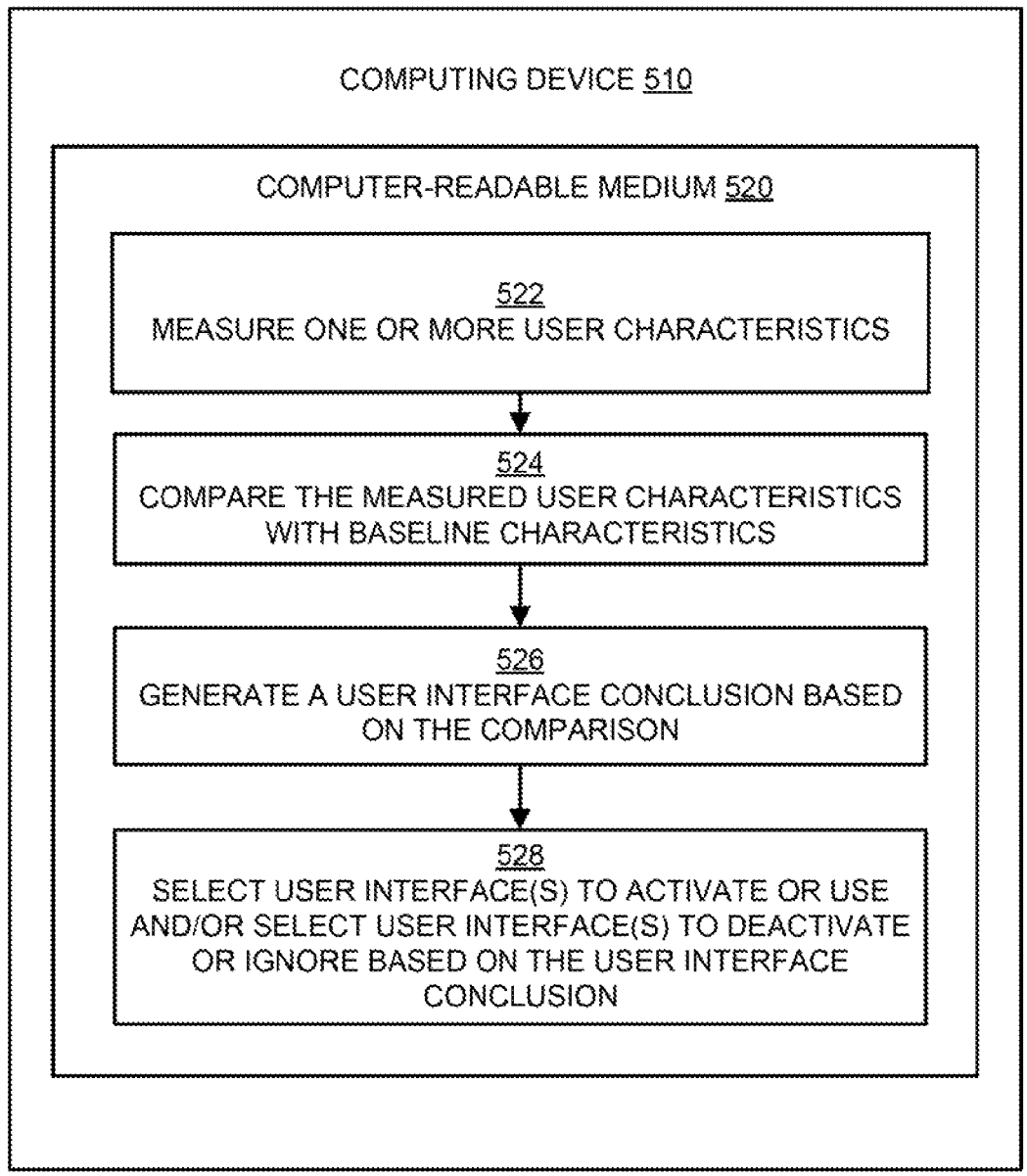
FIG. 5 is a flow diagram illustrating an example method to select user interfaces based on user context that may be performed by a computing device such as the computing device in FIG. 4.

FIG. 5 is a flow diagram illustrating an example method to select user interfaces based on user context that may be performed by a computing device such as the computing device in FIG. 4, arranged in accordance with at least some embodiments described herein.

Example methods may include one or more operations, functions or actions as illustrated by one or more of blocks 522, 524, 526, and/or 528, and may in some embodiments be performed by a computing device such as the computing device 510 in FIG. 5. The operations described in the blocks 522-528 may also be stored as computer-executable instructions in a computer-readable medium such as a computer-readable medium 520 of a computing device 510.

An example process to select user interfaces based on user context may begin with block 522, "MEASURE ONE OR MORE USER CHARACTERISTICS", where a user context analysis module such as the user context analysis module 312 may measure one or more user characteristics, such as user weight, user weight distribution, user gait, or any relevant user characteristic. In some embodiments, the user context analysis module may base the user characteristic measurement on data from one or more sensors, such as the plantar sensor 302.

Block 522 may be followed by block 524, "COMPARE THE MEASURED USER CHARACTERISTICS WITH BASELINE CHARACTERISTICS", where the user context analysis module may compare the user characteristics measured in block 522 with baseline user characteristics, such as the user baseline data 314, as described above.

Block 524 may be followed by block 526, "GENERATE A USER INTERFACE CONCLUSION BASED ON THE COMPARISON", where the user context analysis module may generate a user interface conclusion based on whether the received data differs substantially from the baseline data (e.g., above a particular threshold), as described above. For example, the user context analysis module may generate a user interface conclusion that a particular UI type is available to a user if the received data does not differ significantly from the baseline data, and may generate a user interface conclusion that the UI type is not available to the user if the received data differs significantly from the baseline data.

Block 526 may be followed by block 528, "SELECT USER INTERFACE(S) TO ACTIVATE OR USE AND/OR SELECT USER INTERFACE(S) TO DEACTIVATE OR IGNORE BASED ON THE USER INTERFACE CONCLUSION", where a selection module such as the UI selection module 318 may select UIs to use or ignore based on the user interface conclusion. For example, the UI selection module may select a primary UI to use if the user interface conclusion indicates that the primary UI type is available to a user, and may select a secondary UI to use if the user interface conclusion indicates that the primary UI type is not available to a user, as described above. In some embodiments, the UI selection module may use other information, such as location data, the identity of nearby devices, and/or user preference data to select the UIs to use or ignore.

FIG. 6 illustrates a block diagram of an example computer program product, arranged in accordance with at least some embodiments described herein.

In some examples, as shown in FIG. 6, a computer program product 600 may include a signal bearing medium 602 that may also include one or more machine readable instructions 604 that, when executed by, for example, a processor may provide the functionality described herein. Thus, for example, referring to the processor 404 in FIG. 4, the user interface module 422 may undertake one or more of the tasks shown in FIG. 6 in response to the instructions 604 conveyed to the processor 404 by the medium 602 to perform actions associated with selecting user interfaces based on user context as described herein. Some of those instructions may include, for example, instructions to measure one or more user characteristics, compare the measured user characteristics with baseline characteristics, generate a user interface conclusion based on the comparison, and/or select user interface(s) to activate or use and/or select user interface(s) to deactivate or ignore based on the user interface conclusion, according to some embodiments described herein.

In some implementations, the signal bearing media 602 depicted in FIG. 6 may encompass computer-readable media 606, such as, but not limited to, a hard disk drive, a solid state drive, a compact disc (CD), a digital versatile disk (DVD), a digital tape, memory, etc. In some implementations, the signal bearing media 602 may encompass recordable media 608, such as, but not limited to, memory, read/write (R/W) CDs, R/W DVDs, etc. In some implementations, the signal bearing media 602 may encompass communications media 610, such as, but not limited to, a digital and/or an analog communication medium (e.g., a fiber optic cable, a waveguide, a wired communications link, a wireless communication link, etc.). Thus, for example, the program product 600 may be conveyed to one or more modules of the processor 404 by an RF signal bearing medium, where the signal bearing media 602 is conveyed by the wireless communications media 600 (e.g., a wireless communications medium conforming with the IEEE 802.11 standard).

According to some examples, a method is provided to activate alternative user interfaces based on user context. The method may include measuring a user characteristic using a sensor, determining a difference between the measured user characteristic and a baseline characteristic, generating a user interface conclusion based on the determined difference, and activating a first user interface or a second user interface based on the user interface conclusion.

According to some embodiments, the user characteristic may be foot pressure, weight distribution, and/or a gait. The first user interface may be a hand-based interface and the second user interface may be a voice-based interface and/or a foot-based interface. Activating the first user interface or the second interface may include activating the first user interface in response to determining that the user interface conclusion is normal and activating the second user interface m response to determining that the user interface conclusion is abnormal. In some embodiments, generating the user interface conclusion may include generating the user interface conclusion based on the determined difference and an arm sensor measurement. The method may further include collecting the baseline characteristic prior to measuring the user characteristic. Generating the user interface conclusion may further include generating the user interface conclusion based on the determined difference and a location, a user preference, and/or a nearby device identifier.

According to other examples, a user interface system is provided. The user interface system may include a sensor configured to measure a user characteristic, a first user interface configured to receive user input of a first type, a second user interface configured to receive user input of a second type, and a controller coupled to the sensor, the first user interface, and the second user interface. The controller may be configured to receive a user characteristic measurement from the sensor, determine a difference between the user characteristic measurement and a baseline characteristic, and use the first user interface or the second user interface to receive user input based on the determined difference.

According to some embodiments, the sensor may be a plantar sensor and the user characteristic may be foot pressure, weight distribution, and/or a gait. The first user interface may be a hand-based interface and the second user interface may be a voice-based interface and/or a foot-based interface. The controller may be configured to use the first user interface to receive user input in response to a determination that the determined difference is less than a characteristic threshold and use the second user interface to receive user input in response to a determination that the determined difference is greater than the characteristic threshold.

According to other embodiments, the user interface system may further include an arm sensor configured to provide an arm measurement, and the controller may be configured to determine the difference based on the arm measurement. The controller may be further configured to determine the difference based on one or more environmental parameters, where the environmental parameters may include a location, a user preference, and/or a nearby device identifier. The controller may, be further configured to determine the baseline characteristic prior to receiving the user characteristic measurement.

According to further examples, a user interface selection system is provided. The user interface selection system may include a memory configured to store user characteristic baseline data, a user context analysis module coupled to the memory, and a user interface selection module coupled to the user context analysis module. The user context analysis module may be configured to receive a user characteristic measurement measured by a sensor, determine a difference between the first user characteristic measurement and the baseline data, and generate a user interface conclusion based on the difference. The user interface selection module may be configured to receive the user interface conclusion, and in response to a determination that the user interface conclusion is abnormal, ignore a first user input received from a first user interface and respond to a second user input received from a second user interface.

According to some embodiments, the user characteristic measurement may be associated with foot pressure, weight distribution, and/or a gait. The first user interface may be a hand-based interface and the second user interface may be a voice-based interface and/or a foot-based interface. The user interface selection module may be further configured to respond to the first user input received from the first user interface in response to a determination that the user interface conclusion is normal. The user context analysis module may be further configured to generate the user interface conclusion based on an arm sensor measurement, a location, a user preference, and/or a nearby device identifier.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and; or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), of other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a compact disc (CD), a digital versatile disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing communication and/or network computing/communication systems. The herein described subject matter sometimes illustrates different components contained within, or connected with, different other components, it is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" Should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more") the same holds true for the use of definite articles used to introduce claim recitations. In addition, even if a specific number of an introduced claim recitation is explicitly recited, those skilled in the art will recognize that such recitation should be interpreted to mean at least the recited number (eq., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to activate alternative user interfaces based on user context, the method comprising:
    measuring a user characteristic using a sensor;
    determining a difference between the measured user characteristic and a baseline characteristic;
    generating a user interface conclusion based on the determined difference;
    activating a first user interface in response to determining that the user interface conclusion is normal; and
    activating a second user interface in response to determining that the generated user interface conclusion is abnormal.

2. The method of claim 1, wherein the user characteristic includes at least one of foot pressure, weight distribution, and a gait.

3. The method of claim 1, wherein the first user interface includes a hand-based interface, and wherein the second user interface includes at least one of a voice-based interface and a foot-based interface.

4. The method of claim 1, wherein generating the user interface conclusion comprises generating the user interface conclusion based on the determined difference and an arm sensor measurement.

5. The method of claim 1, further comprising collecting the baseline characteristic prior to measuring the user characteristic.

6. The method of claim 1, wherein generating the user interface conclusion comprises generating the user interface conclusion based on the determined difference and at least one of a location, a user preference, and a nearby device identifier.

7. A user interface system, comprising:
    a sensor configured to measure a user characteristic;
    a first user interface configured to receive user input of a first type;
    a second user interface configured to receive user input of a second type; and a controller coupled to the sensor, the first user interface, and the second user interface, wherein the controller is configured to:
  receive a user characteristic measurement from the sensor,
  determine a difference between the user characteristic measurement and a baseline characteristic; and
  based on the determined difference;
    use the first user interface, to receive the user input of the first type, in response to a determination that the determined difference is less than a particular threshold; and
    use the second user interface, to receive the user input of the second type in response to a determination that the determined difference is greater than the particular threshold.

8. The user interface system of claim 7, wherein:
the sensor includes a plantar sensor; and
the user characteristic includes at least one of foot pressure, weight distribution, and a gait.

9. The user interface system of claim 7, wherein the first user interface includes a hand-based interface, and wherein the second user interface includes at least one of a voice-based interface and a foot-based interface.

10. The user interface system of claim 7, wherein the controller is configured to determine the difference based on at least one environmental parameter.

11. The user interface system of claim 10, wherein the at least one environmental parameter includes at least one of a location, a user preference, and a nearby device identifier.

12. The user interface system of claim 7, wherein the controller is further configured to determine the baseline characteristic prior to the user characteristic measurement being received.

13. A user interface selection system, comprising:
a memory configured to store user characteristic baseline data;
a user context analysis module coupled to the memory and configured to:
  receive a user characteristic measurement, wherein the user characteristic measurement is measured by a sensor;
  determine a difference between the user characteristic measurement and the user characteristic baseline data; and
  generate a user interface conclusion based on the determined difference; and a user interface selection module coupled to the user context analysis module, wherein the user interface selection module is configured to:
  receive the user interface conclusion; and
  in response to a determination that the user interface conclusion is abnormal, at least one of:
    ignore a first user input received from a first user interface; and
    respond to a second user input received from a second user interface.

14. The user interface selection system of claim 3, wherein the user characteristic measurement is associated with at least one of foot pressure, weight distribution, and a gait.

15. The user interface selection system of claim 13, wherein the first user interface includes a hand-based interface, and wherein the second user interface includes at least one of a voice-based interface and a foot-based interface.

16. The user interface selection system of claim 13, wherein the user interface selection module is further configured to, in response to a determination that the user interface conclusion is normal, respond to the first user input received from the first user interface.

17. The user interface selection system of claim 13, wherein the user context analysis module is configured to generate the user interface conclusion based on at least one of an arm sensor measurement, a location, a user preference, and a nearby device identifier.

18. A user interface system, comprising:
a sensor configured to measure a user characteristic;
a first user interface configured to receive user input of a first type;
a second user interface configured to receive user input of a second type;
an arm sensor configured to provide an arm sensor measurement; and
a controller coupled to the sensor, the first user interface, and the second user interface, wherein the controller is configured to:
  receive a user characteristic measurement from the sensor;
  determine, based on the arm sensor measurement, a difference between the user characteristic measurement and a baseline characteristic; and
  based on the determined difference, use one of the first user interface and the second user interface to receive user input.

* * * * *